Jan. 11, 1955  J. R. MARTIN  2,699,277
LETTUCE LOADER RIG
Filed Oct. 12, 1953  4 Sheets-Sheet 1

INVENTOR.
James R. Martin
BY
Hansen and Lane
ATTORNEYS

Jan. 11, 1955
J. R. MARTIN
2,699,277
LETTUCE LOADER RIG
Filed Oct. 12, 1953
4 Sheets-Sheet 2
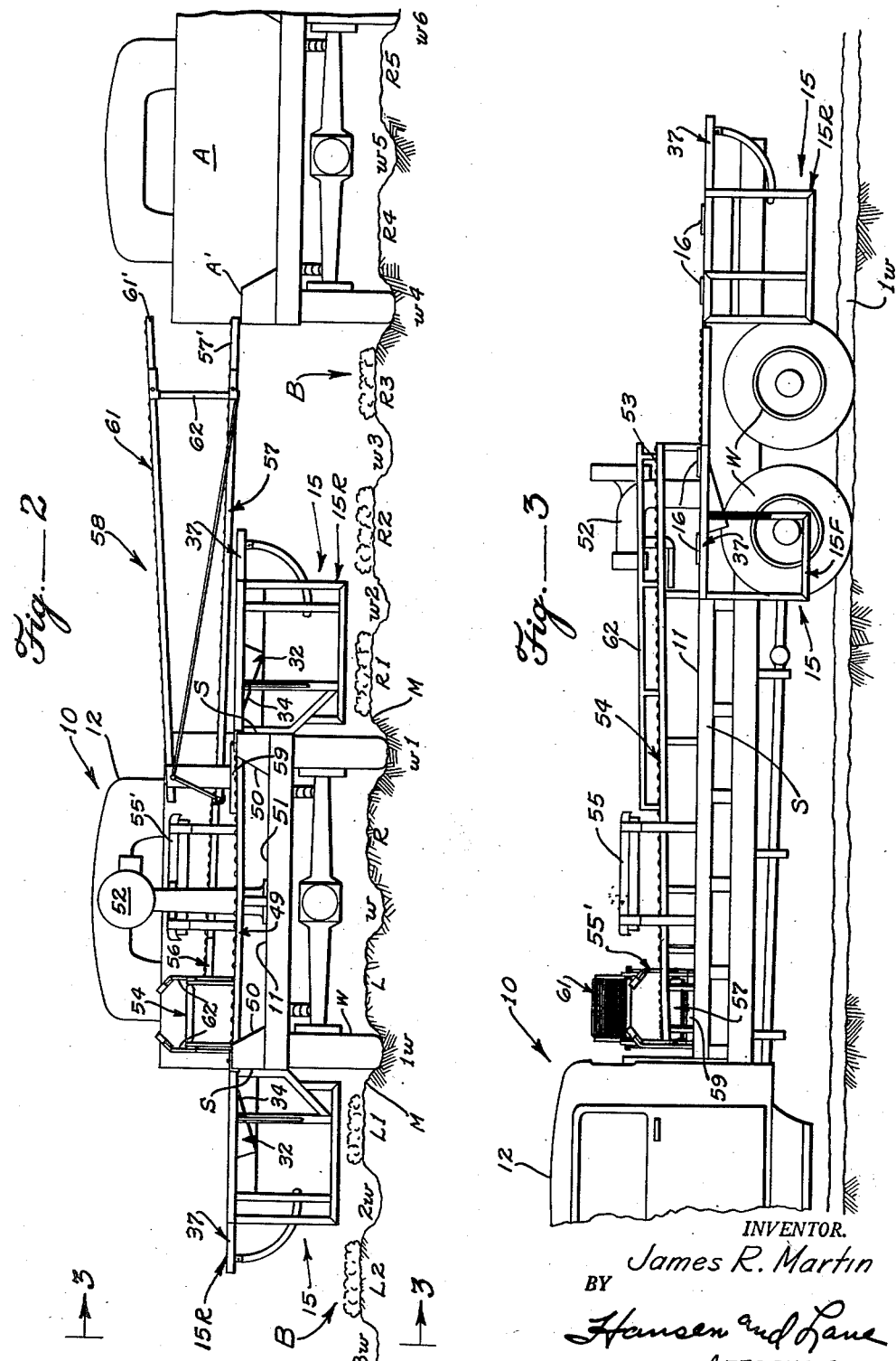
INVENTOR.
James R. Martin
BY
Hansen and Lane
ATTORNEYS INVENTOR.
James R. Martin
BY
Hansen and Lane
ATTORNEYS Jan. 11, 1955          J. R. MARTIN          2,699,277
                    LETTUCE LOADER RIG
Filed Oct. 12, 1953                    4 Sheets-Sheet 4
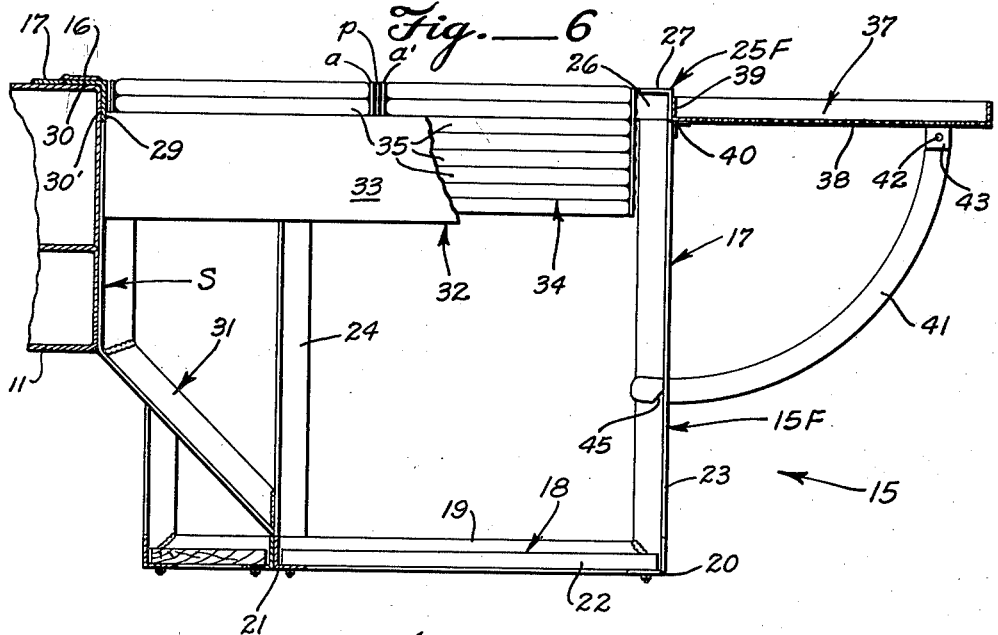
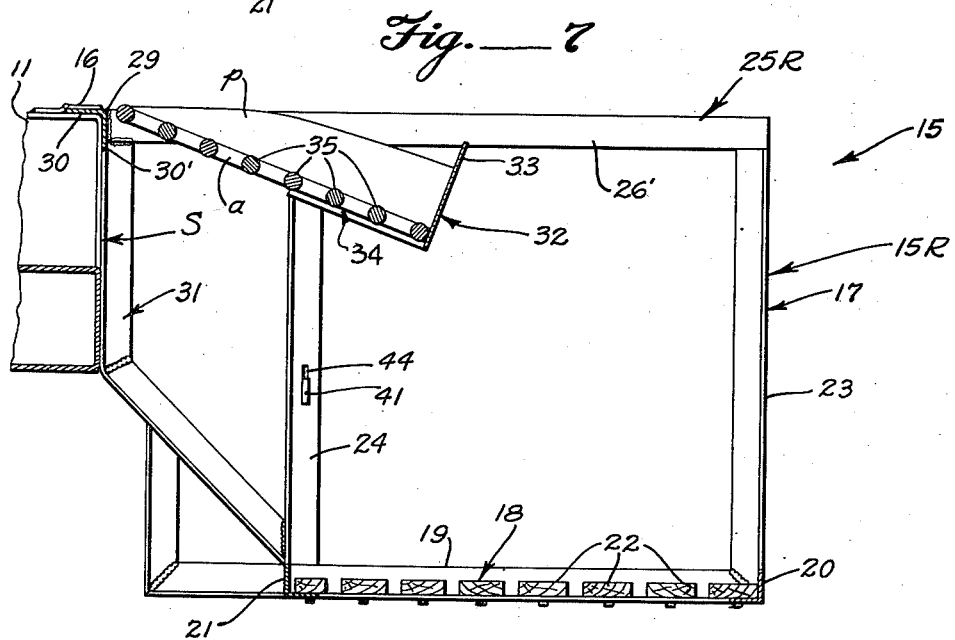
INVENTOR.
James R. Martin
BY
Hansen and Lane
ATTORNEYS

United States Patent Office 2,699,277
Patented Jan. 11, 1955

2,699,277

LETTUCE LOADER RIG

James R. Martin, Salinas, Calif.

Application October 12, 1953, Serial No. 385,436

15 Claims. (Cl. 226—2)

This invention relates to harvesting equipment and more particularly to certain novel improvements in apparatus for facilitating the packing and loading of lettuce or the like directly from the field.

Numerous arrangements have been devised for providing crate handling and loading devices which travel through a field in a manner to enable pickers to place the cut vegetables onto a rig whereon other members of the crew can immediately pack the vegetables into crates. Such prior known devices are bulky, cumbersome and require considerable mechanism for extending, supporting and/or retracting wing type conveyors, catwalks and the like. The present invention contemplates the provision of a simple arrangement for use on a flat bed truck whereby the picking, packing and loading operations are all confined to the immediate proximity of the truck bed.

The foregoing general object of this invention further provides an arrangement including loading platforms attached to the perimeter of the truck bed for ready retraction relative thereto when the truck is to be driven down a street or a highway.

Another object is to provide certain novel improvements in loading platforms for harvesting equipment which facilitate the placement of vegetables direct from the field to a point of proximity to the persons packing the crates. In addition thereto this invention contemplates a compact arrangement of loading platforms around the perimeter of the truck bed to facilitate a central station on the truck bed where one man can busy himself in feeding empty cartons or crates to the loading platforms part of his time and in the balance of his time receive loaded crates or cartons from the several loading platforms and place them on a cross conveyor which discharges onto an auxiliary truck traveling beside the truck carrying the harvesting equipment of the present invention.

These and other objects and advantages of the present invention will become apparent from a reading of the following specification in the light of the drawings in which:

Fig. 2 is a rear elevational view of the truck of Fig. 1 showing its relation to the rows of crops in a field.

Fig. 3 is a side view of the truck shown in Fig. 2 and taken substantially from line 3—3 thereof.

Fig. 6 is a section through the loading platform of Fig. 4 and taken substantially along line 6—6 as the platform is shown in Fig. 1.

Fig. 7 is a section through the trailing platform of Fig. 1 and taken therethrough along line 7—7 thereof.

Figure 1:
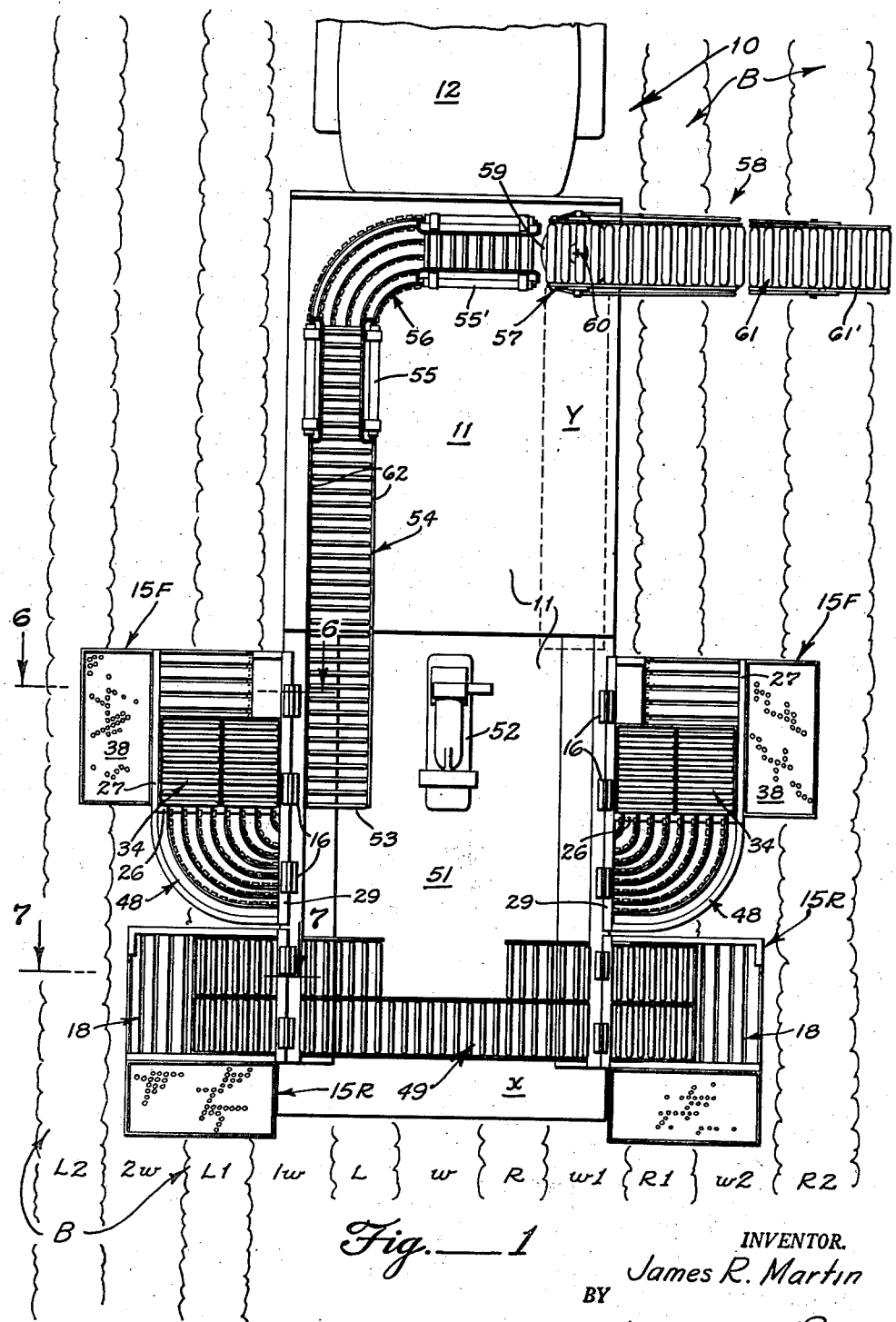
Fig. 1 is a plan view of a truck bed showing the arrangement of applicant's invention thereon.

As best illustrated in Figs. 1 to 3 inclusive, the instant invention is generally associated with a vehicle 10 in the form of a truck having a flat bed 11 mounted on wheels W and drawn by a tractor 12 in the usual manner. The wheels W of the truck are of a gauge to span the beds B for the plants and to travel in the walkways or troughs w between the plant beds B. Ordinarily plant beds such as for lettuce are laid out so that the normal gauged truck will span two beds B whereby the wheels W will run in walkway or trough w, spaced two beds from each other, see Fig. 2.

For purposes of this explanation, the beds B have been designated L and R relative to the center line of the truck 10, the bed L being immediately to the left and bed R to the right of the center line of the truck. Each bed B numerically from bed R is designated R1, R2 and R3, etc. respectively, to the right and L1, L2 and L3 to the left of the beds L and R adjacent the center line of the truck. The centermost walkway or trough is designated w while each trough to the right thereof is designated numerically w1, w2, w3, etc. in the right hand direction while the troughs to the left of center are designated 1w, 2w and 3w, respectively.

The wheels of the truck 10 are thus disposed in the troughs 1w and w1 and straddle beds L and R and the centermost trough w therebetween. The sides S of the truck bed 11 are thus disposed directly above the inside margins M of the beds L1 and R1 relative to the centerline of the truck. It will thus be seen that the sides S of the truck bed 11 are slightly outside the centers of the troughs 1w and w1 within which the wheels W run for reasons later to become apparent.

Figure 4:
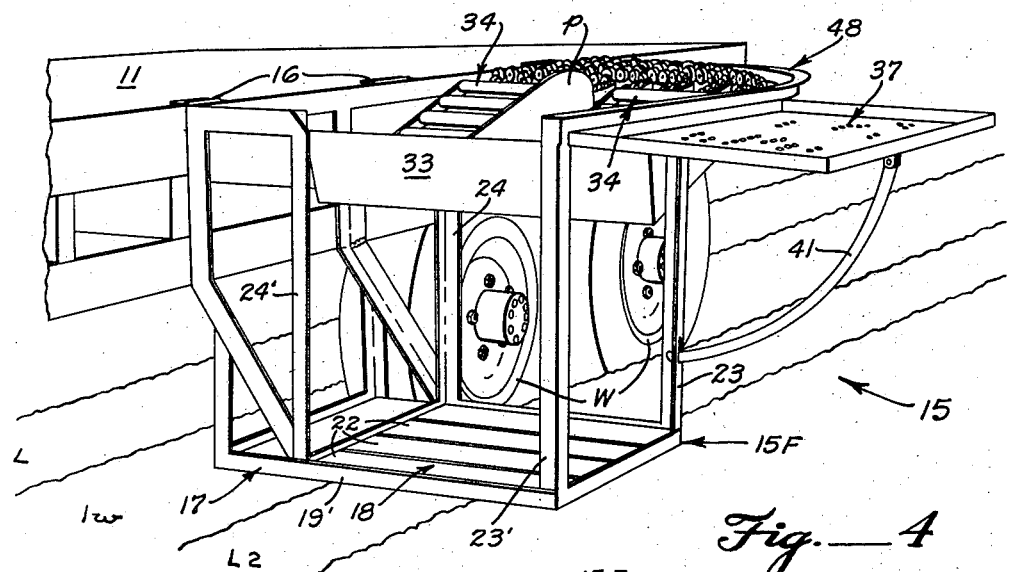
Fig. 4 is a perspective view of one of the loading platforms embodied in the present invention as illustrated in Figs. 1, 2 and 3.
Figure 5:
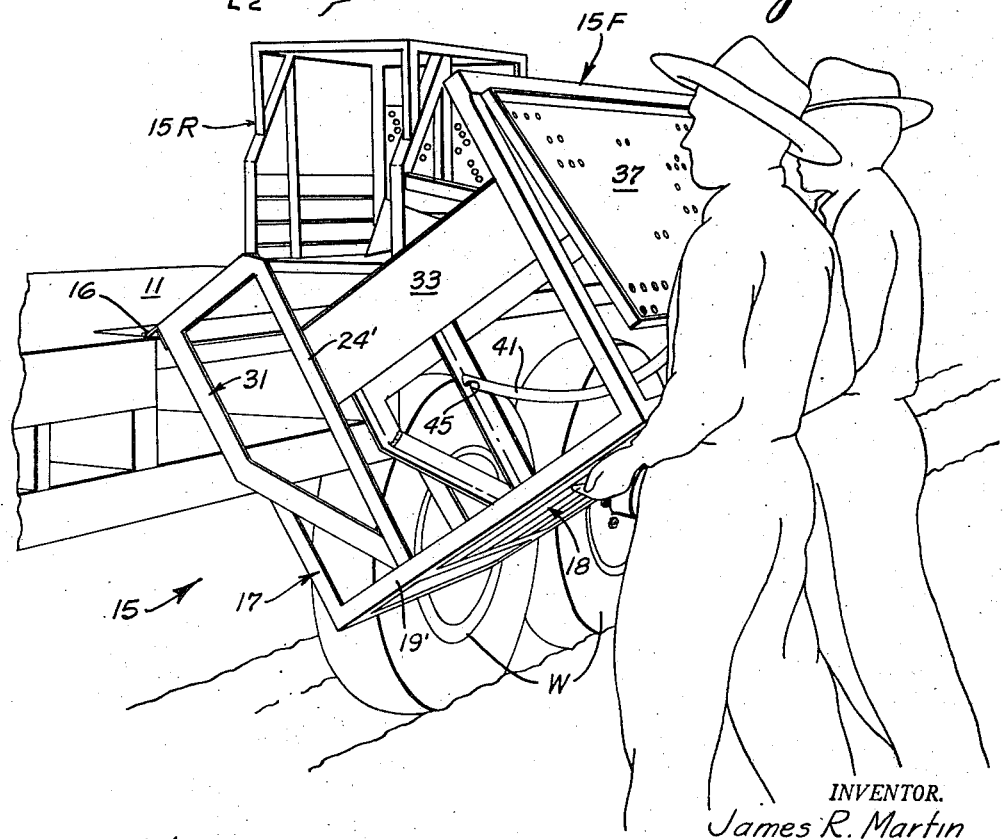
Fig. 5 is a perspective view similar to that of Fig. 4 illustrating the manner of extending or retracting the loading platform.

In connection with the present invention, the truck bed 11 carries a plurality of loading stations 15 adapted to extend outwardly from the truck bed in a manner to overlie the beds L1 and R1 adjacent the sides S of the truck bed. These loading stations 15 are hingedly connected to the respective sides S of the truck bed by hinges 16 (Figs. 4 through 7) to facilitate swinging of the stations upwardly onto the truck bed 11 when the stations 15 are not in use. This is most usually during transport of the vehicle 10 along a public road, through normal width driveways, or the like. In this connection, it should be noted that the loading stations are dimensioned to approximately one-half the width of the truck bed so as to lie flat upon the truck bed in inverted position as illustrated in Fig. 5. Moreover, it will thus be seen that when a loading station 15 is swung outwardly from the truck bed to extend laterally therefrom, each loading station will extend an additional one-half the width of the truck bed or over the next adjacent bed L1 or R1 as the case may be.

Each loading station 15 is of substantially the same construction and therefore like reference numerals will indicate like parts, there being slight modifications between the rearmost stations 15R (Fig. 7) with respect to the foremost ones 15F (Fig. 6) as will be explained in due course.

Referring now more particularly to Figs. 4 through 7 each loading station 15 comprises a frame 17 having a platform base 18 including angle iron sides 19 and 19' jointed at their outer ends to an angle iron end 20 and inwardly of but adjacent their opposite ends secured to the ends of a cross angle 21 extending parallel to the outer angle iron 20. The arrangement is such that the angle irons 19—19', 20 and 21 have one of their flanges upright and their opposite flanges extending inwardly relative to the frame 17 to support cross slats 22 to complete the platform base 18.

The platform base 18 just explained is suspended from two corner angles 23—23' and two inner angles 24—24', each of which has its upper ends secured to a cap frame 25F or 25R depending upon whether it is for use with the foremost station 15F or the rearmost station 15R.

In the case of the fore type station 15F the cap frame 25F comprises one angle iron 26 secured to the upper ends of the inner strut 24 and the corner angle 23; another angle iron 27 having its ends secured to the upper ends of the corner angles 24—24'; and a short angle iron 28 secured to the opposite inner strut 24' only and extending parallel to the cap angle iron 26 toward the side wall S of the truck bed 11. The end of each of the angles 26 and 28 are secured to an inverted angle iron member 29 disposed with one of its flanges 30 adapted to overlie the top surface of the truck bed and its opposite flange 30' adapted to bear against the side S thereof. As best seen in Figs. 4, 5 and 6, the flange 30 of angle iron member 29 is welded to one wing of the hinge 16 whereas the opposite wing of the hinge 17 is secured to the top surface of the truck bed 11, there being two or more such hinges 16 so disposed.

In the case of the rear type station 15R the cap frame 25R includes a pair of side cap angles 26'—28' of similar length each welded to the upper ends of the respective inner strut 24 or 24' and corner angles 23 or 23' as the case may be. The inner ends of each of the side cap angles 26'—28' are secured by welding to an angle iron member 29' which is adapted to overlie the corner of the truck bed 11 and has hinged connection therewith in exactly the same manner as hereinbefore explained in connection with the angle member 29 and the hinges 16 (see Fig. 7).

In either case, i. e., fore or aft station 15F or 15R it will be noted that one side of the frame 17 is open to permit a person to step up from earth to the platform 18.

Each frame 17, i. e., for either fore or aft type station, includes a pair of downwardly extending bracket angles 31—31' having their upper portions secured by welding to the vertical flange 30' of the angle iron member 29 or 29'. These bracket angles 31—31' extend downwardly for sidewise bearing against the side S of the truck bed 11 as shown in Figs. 6 and 7. From the lowermost edge of the side S of the truck bed the bracket angles 31 and 31' are bent outwardly for extension at an angle toward the point of juncture of the angle iron sides 19—19' of the base 18 and the inner upright angles 24—24' to which the lower ends of the bracket angles 31—31' are welded. It will thus be seen that any load placed upon the platform 18 as well as the entire frame 17 is transmitted via the bracket angles 31—31' to the side wall S of the truck bed 11.

The platform 18 is constructed to support the slats 22 adjacent to the open side of the frame 17 so that a man can stand on the slats 22 to either face the truck bed in case of the aft station 15R or to face rearwardly of the direction in which the vehicle 10 is moving over the field.

In addition to the provision of the platform 18 each frame 17 is provided with a support 32 for a carton or box to be filled with vegetables. The support 32 comprises a V trough 33 carried by and between the cap angles of the frame 17. In the case of the aft station 15R the V trough 33 has its lower wall 34 disposed to incline from the platform area toward the upper surface of the truck bed 11. In the case of the fore station 15F the lower wall 34 of the trough 33 inclines from the platform area toward the rearmost cap angle 26 of the frame 17.

More specifically the lower wall 34 of the trough 33 comprises a plurality of spaced rollers 35 extending transverse to the direction of inclination of the wall 34 and the opposite leg 36 of the V trough 33 constitutes a bulkhead against which a carton engages while resting on the rollers 35. In this manner a person standing on the platform 18 has a carton supported at approximate counter height adjacent him so that he can easily pack loose vegetables into the carton without stooping. The rollers 35 are divided into two sections by central supporting angles a—a' spaced from each other to receive a partition p. Thus when small cartons are used only one side of the inclined conveyor 34 need be employed but both sides can be used when, for example, one-half cartons as well as full cartons are disposed on the conveyors 34. However, if larger cartons or crates are being packed the partition p is removed. The person on the platform receives the vegetables from a table 37 which extends to his right or left depending upon which side of the truck bed he is on. This table 37 is a pan-like member having a perforated bottom 38 and having one of its side edges 39 hingedly connected, as at 40, to the adjacent cap angle of the frame 17. In the case of the fore stations 15F the table 37 is hinged to the outer angle iron 27 (Fig. 6) whereas on the aft stations 15R the table is hinged to one side angle 26' or 28' as the case may be (see Fig. 1).

Each table 37 is provided with an arcuate bracket 41 having its upper end pivotally connected as at 42 to an ear 43 secured to the underside of the bottom 38 of the table. The opposite or free end of the arcuate bracket 41 extends through a slot 44 formed in either the adjacent upright corner angle iron 23 (Fig. 6) or the upright inner angle iron 24 (Fig. 7). The free end of each arcuate bracket 41 is provided with a notch 45 adapted to engage the lower margin of the slot 44 through which the bracket extends to thereby latch the table in upraised position as illustrated in Figs. 4 and 6. However, when it is desired to lower the table 37 one need only lift the free end of the arcuate bracket 41 to disengage its notch 45 from the lower margin of the slot 44 whereupon the table 37 is free to swing into a downwardly hanging position alongside the frame 17 (see Fig. 5).

As best seen in Fig. 2, when the table 37 is in upraised (horizontal) position on the fore stations 15F the outer margin of the table is disposed approximately centrally above the next adjacent bed B. In other words, on the left hand side of the truck bed the table 37 extends to the center of the bed L2 whereas on the right the table 37 of the opposite station 15F extends to the center of the bed R2. It will thus be seen that the rig embodying the present invention spans substantially two and one-half plant beds B to either side of the center of the truck bed or five plant beds in all. However, it should be noted that in addition to the three plant beds to either side of the center of the truck 10, the next two beds (L3—L4 and R3—R4) have been picked and the lettuce stacked for loading. It will, therefore, be seen that ten beds of the precut lettuce are handled from the span provided by the lettuce loading rig of the present invention.

The convenience of the foregoing arrangement resides in the manner in which the vegetables are handled from the field to the loading stations as will now be explained.

With the rig of the present invention it is proposed to use ten men called cutters ahead of the truck for cutting and placing the heads of lettuce. These cutters after cutting the heads of lettuce, place them on the beds L1, L2, L3, R1, R2 and R3, as illustrated in Fig. 2. Four additional men, called pickup men, walk along the field, two beside the rig, one in trough 3w and one in trough w3, and two adjacent the rear of the rig, one in trough 2w and one in trough w2. Thus, one pickup man is adjacent each loading station 15F at each side as well as the two loading stations 15R adjacent the rear of the truck bed. It should here be noted that the tables 37 on both rearmost stations 15R extend rearwardly therefrom so that each of the trailing pickup men can walk along troughs 2w or w2 as the case may be and readily deposit the lettuce on the respective table 37 adjacent him. Thus the trailing pickup men can take the precut lettuce from the beds L2, L1, R1, R2 and place such heads of lettuce on the tables 37 of the rearmost loading stations 15R. The pickup men serving the foremost loading station 15F walk along the troughs 3w or w3 as the case may be, taking the heads of lettuce from the beds L3—L2 or R2—R3 and placing them on the table 37 of the adjacent loading stations 15F at the sides of the truck bed. It will be apparent, however, that since both fore and aft pickup man takes lettuce from the bed L2 and/or R2 each need pick up only one-half of the lettuce on bed L2 or R2, consequently, since all of the lettuce cut from bed L or R is placed on bed L1 or R1 and all of the lettuce cut from bed L4 or R4 is placed on bed L3 or R3, each man picks up about 2½ beds of lettuce as the rig travels down the field.

As hereinbefore indicated, there is one man, called a packer, on the platform of each loading station making four packers in all asociated with each rig. The packers at each station take the heads of lettuce from their adjacent table 37 and pack them into the cartons which are supported on the inclined roller supports 32 of their particular station. In this manner the freshly cut lettuce is placed in a carton almost immediately after cutting and therefore there is a minimum amount of wilting or deterioration of the outer leaves on the head lettuce. This entails a considerable savings since there is a minimum of waste and furthermore a much better pack in each shipping carton is attained.

As best seen in Fig. 1, as soon as each carton is filled at each loading station, the packer pushes the filled carton up the inclined roller bottom 34 and onto the top surface of the truck bed. For purposes of convenience, an arcuate roller conveyor 48 of conventional design is associated with each fore station 15F. These arcuate conveyors 48 have their receiving ends supported on the cap angle iron 26 and terminate at the angle iron member 29 which is connected by the hinges 16 to the top surface of the truck bed 11. It will thus be seen that the arcuate conveyors are formed as a part of the fore stations 15F for movement therewith about the axes of the hinges 16 between operative and inoperative position.

In the case of the rearmost stations 15R the cartons fed from the roller supports 34 thereof land upon a transverse roller conveyor 49 extending directly across the top surface of the truck bed or partly so as shown in Fig. 1.

Referring now to Fig. 2, it will be noted that the truck bed 11 is formed with a gunwale 50 adjacent its sides to thereby leave a pit or lower level platform 51 between the two sides of the truck bed. Note also that the transverse conveyor 49 is supported at a level above the truck bed platform 51, i. e., at the plane of the upper terminal end of the inclined supports 34 of the loading stations 15R. Thus it will be seen that a man standing on the truck bed platform 51 need not stoop to pick up the filled cartons as they are fed onto the truck bed from the respective loading stations around its sides and end.

In connection with the foregoing, it is proposed that three men work on the truck bed platform 51, one called the "stitcher man," another the "folder" or "empty man" and still another called the "loader," all of whom cooperate in the feeding of empty cartons to the several loading stations and to receive filled cartons therefrom for final closing and stapling preparatory to transmission of the closed cartons to an auxiliary vehicle A (see to the left in Fig. 2).

The arrangement on the truck bed is best shown in Figs. 1, 2 and 3. At the rear zone of the truck bed 11, a carton stitcher 52 of well known design is placed between the two fore loading stations 15F upon the truck bed platform 51. To one side of the stitcher 52, preferably to the left, Fig. 1, is the receiving end 53 of a full carton conveyor 54. This conveyor 54 runs downhill from its receiving end 53 as shown in Fig. 3, and terminates in a carton press 55. Adjacent the carton press 55 the conveyor 54 unloads onto a curved conveyor 56 which enters a wood press 55' all of which continue in a downhill decline toward an unloading conveyor 57.

The unloading conveyor 57 is formed as a part of a boom frame 58 mounted for pivotal movement on a turntable or fifth wheel 59 having its axis 60 disposed centrally of the discharge end of the wood press 55' as well as a space parallel to one side of the truck bed 11 suitable to receive the boom frame (see dotted lines Fig. 1). In this manner the boom frame 58 can be disposed within the marginal limits of the truck bed 11 when the vehicle 10 is in transit. Contrarywise when the rig is operating in a field the boom frame 58 is disposed to be swung outwardly, i. e., laterally from the truck bed 11 and to have its free end disposed upon the bed A' of the auxiliary vehicle A hereinbefore mentioned.

The auxiliary vehicle is adapted to run with its wheels in troughs W4 and W6 to the right of the vehicle 10 upon which the rig of the present invention is carried as is shown in Fig. 2. Consequently, since the turntable end of the boom frame 58 is slightly higher than the level of the bed A' of the auxiliary vehicle A there is a slight decline and natural fall tending to cause the filled cartons to gravitate toward the auxiliary vehicle.

The auxiliary vehicle carries a supply of collapsed or folded cartons which are initially passed over the rig carried on the vehicle 10. It should be understood, however, that wooden-wire bound crates may be used in lieu of cartons. For accomplishing this the boom frame 58 carries a second level conveyor 61 directly above the unloading conveyor 57 and inclined in a direction opposite to the inclination of the latter. This second level conveyor 61 has its receiving end supported on upstanding side struts 62 above the discharge end of the unloading conveyor 57 and fixedly connected thereto. Both the unloading and second level conveyor 57—61 have their free ends 57'—61', respectively, pivotally connected to their main sections so as to swing back upon the same when the conveyors are not in use. However, when extended these pivotally mounted free ends 57'—61' are adapted to extend in a direct line from their main sections, as shown in Fig. 2.

During operation of the rig of the present invention in the field, empty cartons in flat or folded condition are transferred by way of the second level conveyor 61 from the auxiliary vehicle to the vehicle 10. One of the men (stitcher man) on the truck bed 11 takes the collapsed empties from the lower end of conveyor 61 and either takes them directly to the stitcher 52 or places them in the void spaces on the truck bed 11 until they are needed. Such void spaces would be at X along the rear margin of the truck bed in back of the transverse conveyor 49 or that space Y from which the unloading conveyor 57 has been removed into operative position.

The man at the carton stitcher 52 opens up the collapsed cartons and initially stitches the bottoms thereof closed, and with the assistance of the folder or empty man passes the empty open cartons on to the packers on the respective loading stations 15F and 15R. Simultaneously with the foregoing, the empty man or folder takes the cartons which have been packed with lettuce from the arcuate conveyors 48 (at stations 15F) or from the transverse conveyor 49 (between stations 15R) folds the flaps down and places these packed cartons on the receiving end 53 of the full carton conveyor 54. The packed cartons on the full carton conveyor 54 are firmly held between side rails 62 on the latter which tend to prevent the packed cartons from bulging out sidewise while the top flaps are folded inwardly incident to movement of the full cartons onto the carton press 55 or 55'.

While the cartons are in the press 55 the top flaps of these cartons are stapled into closed condition by the lidder after which the now closed cartons are passed downhill onto the unloading conveyor 57. The sealed cartons are transmitted across the conveyor 57 to the auxiliary truck A where the man thereon places the closed cartons on pallets upon which stacks of cartons are readied for multiple handling in the customary manner by fork lift trucks.

In the case of packing lettuce in cardboard cartons it has become the practice for the auxiliary truck to carry the pallets, upon which the closed cartons are stacked, to a vacuum cooling device at track side, i. e., at a railroad loading platform.

In this manner, the stacks of closed cartons are transported from the field to a pre-cooling device in a minimum of time. After the heat has been extracted from the cartons by passage thereof through the vacuum cooler, the cartons are immediately placed in refrigerator cars by which they are to be shipped to marketing centers across the country.

While the foregoing description has been directed to the use of cardboard cartons in conjunction with the present invention it should be apparent that wooden wire bound crates can be filled and packed therewith in the same manner. In the case of wooden crates the crates now pass through the carton press 55 and on to the other press 55'. The wood press is of conventional design having means for tying the crates with baling wire or for nailing the lids onto the crates.

In either event, the method of handling empty crates or cartons as well as fully packed ones is the same so that in all other respects the invention herein is adapted for packing of the freshly cut heads of lettuce and for transporting of the same in a minimum of time to a precooling device preparatory to loading them into refrigerator cars.

While I have described the loading apparatus herein in specific detail, it will be apparent that the same is susceptible to variations, modifications and/or alterations without departure from the inventive concept. I, therefore, desire to avail myself of all variations, modifications and/or alterations as fairly come within the purview of the appended claims.

What I claim and desire to protect by Letters Patent is:

1. A rig for packing and loading crops which have been cut and stacked on the plant beds in which they were grown including a flat bed vehicle on wheels adapted to travel in furrows between said plant beds, a dual level conveyor including a boom frame having one end pivotally mounted on said flat bed adjacent one corner thereof and adapted to extend laterally of said flat bed for receiving and discharging cartons from and to an auxiliary truck traveling parallel to said vehicle, said dual level conveyor being swingable onto said flat bed during transit of said vehicle, a carton stitcher arranged centrally on said flat bed to facilitate assembly and stitching of empty cartons received from said auxiliary truck via said dual level conveyor, a plurality of loading stations arranged around the perimeter of said flat bed in proximity to said stitcher for manual receipt of assembled stitched cartons therefrom, each said loading station including a frame pivotally mounted on the adjacent side wall of said flat bed to facilitate swinging of said loading stations up onto the same during transit of said vehicle, each said frame comprising a platform disposed above the crops stacked on an adjacent plant bed when said loading station is disposed outwardly of said flat bed, an inclined conveyor on said frame for supporting an empty carton at counter height above said platform and to facilitate manual discharge of a loaded carton therefrom up onto said flat bed, and a table mounted on the upper edge of said frame adjacent said inclined conveyor for supporting adjacent the latter crops manually picked up from said plant beds upon which they were stacked.

2. A rig for packing and loading crops which have been cut and stacked on the plant beds in which they were grown including a flat bed vehicle on wheels adapted to travel in furrows between said plant beds, a dual level conveyor including a boom frame having one end pivotally mounted on said flat bed adjacent one corner thereof and adapted to extend laterally of said flat bed for receiving and discharging cartons from and to an auxiliary truck traveling parallel to said vehicle, said dual level conveyor being swingable onto said flat bed during transit of said vehicle, a carton stitcher arranged centrally on said flat bed to facilitate assembly and stitching of empty cartons received from said auxiliary truck via said dual level conveyor, a plurality of loading stations arranged around the perimeter of said flat bed in proximity to said stitcher for manual receipt of assembled stitched cartons therefrom, each said loading station including a frame pivotally mounted along one side of its upper edge on the adjacent side wall of said flat bed to facilitate swinging of said loading stations up onto the same during transit of said vehicle, each said frame comprising a platform disposed above the crops stacked on adjacent plant beds when said loading station is disposed outwardly of said flat bed, an inclined conveyor on said frame supporting an empty carton at counter height above said platform and to facilitate manual discharge of a loaded carton therefrom up onto said flat bed, a table hingedly mounted along another side of the upper edge of said frame adjacent said inclined conveyor thereon, and a releasable bracket between said frame and table for supporting the latter in extended position adjacent the upper edge of said frame to receive and support crops handed up onto the same from the plant beds upon which they were stacked.

3. A rig for packing and loading crops which have been cut and stacked on the plant beds in which they were grown including a flat bed vehicle on wheels adapted to travel in furrows between said plant beds, a dual level conveyor including a boom frame having one end pivotally mounted on said flat bed adjacent one corner thereof and adapted to extend laterally of said flat bed for receiving and discharging cartons from and to an auxiliary truck traveling parallel to said vehicle, said dual level conveyor being swingable onto said flat bed during transit of said vehicle, a carton stitcher arranged centrally on said flat bed to facilitate assembly and stitching of empty cartons received from said auxiliary truck via said dual level conveyor, a plurality of loading stations arranged around the perimeter of said flat bed in proximity to said stitcher for manual receipt of assembled stitched cartons therefrom, each said loading station including a frame pivotally mounted on the adjacent side wall of said flat bed to facilitate swinging of said loading stations up onto the same during transit of said vehicle, each said frame comprising a platform disposed above the crops stacked on an adjacent plant bed when said loading station is disposed outwardly of said flat bed, an inclined conveyor on said frame for supporting an empty carton at counter height above said platform and to facilitate manual discharge of a loaded carton therefrom up onto said flat bed, and a table mounted on the upper edge of said frame adjacent said inclined conveyor for supporting adjacent the latter crops manually picked up from said plants beds upon which they were stacked, and a full carton conveyor arranged on said flat bed and along one side thereof opposite to that on which said dual conveyor is supported, said full carton conveyor having one end disposed at the central zone of said flat bed to receive full cartons passed up onto the same from the several loading stations and having its discharge end disposed to transfer full cartons into one level of said dual level conveyor for transmission onto said auxiliary truck.

4. A rig for packing and loading crops which have been cut and stacked on the plant beds in which they were grown including a flat bed vehicle on wheels adapted to travel in furrows between said plant beds, a dual level conveyor including a boom frame having one end pivotally mounted on said flat bed adjacent one corner thereof and adapted to extend laterally of said flat bed for receiving and discharging cartons from and to an auxiliary truck traveling parallel to said vehicle, said dual level conveyor being swingable onto said flat bed during transit of said vehicle, a carton stitcher arranged centrally on said flat bed to facilitate assembly and stitching of empty cartons received from said auxiliary truck via said dual level conveyor, a plurality of loading stations arranged around the perimeter of said flat bed in proximity to said stitcher for manual receipt of assembled stitched cartons therefrom, each said loading station including a frame pivotally mounted along one side of its upper edge on the adjacent side wall of said flat bed to facilitate swinging of said loading stations up onto the same during transit of said vehicle, each said frame comprising a platform disposed above the crops stacked on adjacent plant beds when said loading station is disposed outwardly of said flat bed, an inclined conveyor on said frame supporting an empty carton at counter height above said platform and to facilitate manual discharge of a loaded carton therefrom up onto said flat bed, a table hingedly mounted along another side of the upper edge of said frame adjacent said inclined conveyor thereon, a releasable bracket between said frame and table for supporting the latter in extended position adjacent the upper edge of said frame to receive and support crops handed up onto the same from the plant beds upon which they were stacked, and a full carton conveyor arranged on said flat bed and along one side thereof opposite to that on which said dual conveyor is supported, said full carton conveyor having one end disposed at the central zone of said flat bed to receive full cartons passed up onto the same from the several loading stations and having its discharge end disposed to transfer full cartons into one level of said dual level conveyor for transmission onto said auxiliary truck.

5. A rig for packing and loading crops directly from beds of plants in a field including a wheeled vehicle having a flat truck bed, a plurality of loading stations hingedly attached to the perimeter of said truck bed, each said loading station comprising: a frame including an angle iron cap adapted to lie adjacent and parallel to one side wall of said truck bed, a plurality of hinges secured to one angle iron side of said angle iron cap and the top portion of said truck bed with the axes of said hinges in register along said side wall thereof, bracket angles secured to said one angle iron side of said cap angle and adapted to engage said one side wall of said truck bed for supporting said frame with its angle iron cap parallel to the top surface of said truck bed, said frame having a platform at its lower extremity disposed a distance above said beds of plants to clear the vegetables stacked thereon, and an inclined roller conveyor supported on said frame for holding an empty carton at substantial counter height above said platform and said roller conveyor having its upper end disposed to discharge loaded cartons onto said truck bed.

6. A rig for packing and loading crops directly from beds of plants in a field including a wheeled vehicle having a flat truck bed, a plurality of loading stations hingedly attached to the perimeter of said truck bed, each said loading station comprising: a frame including an angle iron cap one angle iron side of which is adapted to lie adjacent and parallel to one side wall of said truck bed, a plurality of hinges secured to said one angle iron side of said cap and the top portion of said truck bed with the axes of said hinges in register along said side wall of the truck bed, bracket angles extending downwardly from said one angle iron side of said cap adapted to engage said one side wall of said truck bed for supporting the angle iron cap of said frame parallel to the top surface of said truck bed, a pair of angle iron corner members suspended from the outer corners of the angle iron cap of said frame, a platform supported at the lower extremity of said bracket angles and said corner members at a distance above said beds of plants to clear the vegetables stacked thereon, and an inclined conveyor supported on said frame having its lower end disposed at substantial counter height above said platform and its upper end disposed to discharge loaded cartons onto said truck bed.

7. A rig for packing and loading crops directly from beds of plants in a field including a wheeled vehicle having a flat truck bed, a plurality of loading stations hingedly attached to the perimeter of said truck bed, each said loading station comprising: a frame including an angle iron cap adapted to lie adjacent and parallel to one side wall of said truck bed, a plurality of hinges secured to said angle iron cap and the top portion of said truck bed, bracket angles secured to said angle iron cap adjacent that portion thereof secured to said hinges for engaging said one side wall of said truck bed for supporting said frame with its cap angle parallel to the top surface of said truck bed, a platform carried by said bracket angles having its lower extremity disposed a distance above said beds of plants to clear the vegetables stacked thereon, and an inclined conveyor supported on said frame with its lower end disposed at substantial counter height above said platform and its upper end disposed to discharge loaded cartons onto said truck bed, said inclined conveyor comprising a plurality of transverse rolls and a removable median strip providing a partition between the ends of said rolls to facilitate the loading and handling of small sized cartons on said inclined conveyor.

8. A rig for packing and loading crops directly from beds of plants in a field including a wheeled vehicle having a flat truck bed, a plurality of loading stations hingedly attached to the perimeter of said truck bed, each said loading station comprising: a frame including an angle iron cap adapted to lie adjacent and parallel to one side wall of said truck bed, a plurality of hinges secured to said angle iron cap and the top portion of said truck bed, bracket angles secured to said angle iron cap adjacent that portion thereof secured to said hinges for engaging said one side wall of said truck bed for supporting said frame with its cap angle parallel to the top surface of said truck bed, a platform carried by said bracket angles having its lower extremity disposed a distance above said beds of plants to clear the vegetables stacked thereon, an inclined conveyor supported on said frame with its lower end disposed at substantial counter height above said platform and its upper end disposed to discharge loaded cartons onto said truck bed, said inclined conveyor comprising a plurality of transverse rolls and a removable median strip providing a partition between the ends of said rolls to facilitate the loading and handling of small sized cartons on said inclined conveyor, a table hingedly mounted on said angle iron cap of said frame adjacent said inclined conveyor, and means for supporting said table for receiving crops placed upon the same from the plant beds by manual pickers.

9. A rig for packing and loading crops directly from beds of plants in a field including a wheeled vehicle having a flat truck bed, a plurality of fore loading stations hingedly attached to the sides of said truck bed midway its ends, a pair of aft loading stations hingedly attached to the sides of said truck bed adjacent its aft end, each said loading station comprising a frame including an angle iron cap adapted to overlie the top and side wall of said truck bed, a plurality of hinges secured to said angle iron cap and the top portion of said truck bed with the axes of said hinges in register, bracket angles extending downwardly from said angle iron cap adapted to engage said one side wall of said truck bed for supporting said frame with its angle iron cap parallel to the top surface of said truck bed, said frame having a pair of angle iron corners suspended from said angle iron cap, a platform at its lower extremity disposed a distance above said beds of plants to clear the vegetables stacked thereon, and an inclined roller conveyor supported on said frame for holding an empty carton at substantial counter height above said platform and said roller conveyor having its upper end disposed adjacent said angle iron cap.

10. A rig for packing and loading crops directly from beds of plants in a field including a wheeled vehicle having a flat truck bed, a plurality of fore loading stations hingedly attached to the sides of said truck bed midway its ends, a pair of aft loading stations hingedly attached to the sides of said truck bed adjacent its aft end, each said loading station comprising a frame including an angle iron cap adapted to overlie the top and side wall of said truck bed, a plurality of hinges secured to said angle iron cap and the top portion of said truck bed with the axes of said hinges in register, bracket angles extending downwardly from said angle iron cap adapted to engage said one side wall of said truck bed for supporting said frame with its angle iron cap parallel to the top surface of said truck bed, said frame having a pair of angle iron corners suspended from said angle iron cap, a platform at its lower extremity disposed a distance above said beds of plants to clear the vegetables stacked thereon, an inclined roller conveyor supported on said frame for holding an empty carton at substantial counter height above said platform and said roller conveyor having its upper end disposed adjacent said angle iron cap, a table hingedly mounted on said angle iron cap of said frame adjacent said inclined conveyor, and means for supporting said table for receiving crops placed upon the same from the plant beds by manual pickers.

11. In a rig for packing and loading crops which have been cut and stacked on the plant beds in which they were grown including a flat bed truck on wheels adapted to travel in furrows between said plant beds; a plurality of loading stations around the perimeter of said truck bed adapted to extend outwardly therefrom in a manner to overlie the plant beds adjacent the sides of said truck bed, hinge means for hingedly securing said loading stations to the respective sides of said truck bed to facilitate swinging of said loading stations upwardly onto said truck bed during transport of said vehicle along a public road, each of said loading stations comprising a frame including an angle iron cap one angle iron side of which is adapted to lie adjacent and parallel to one side wall of said truck bed, said hinge means including a plurality of hinges secured to said one angle iron side of said cap and the top portion of said truck bed with the axes of said hinges in register along said side wall of the truck bed, bracket angles extending downwardly from said one angle iron side of said cap adapted to engage said one side wall of said truck bed for supporting the angle iron cap of said frame parallel to the top surface of said truck bed, a pair of angle iron corner members suspended from the outer corners of the angle iron cap of said frame, a platform supported at the lower extremity of said bracket angles and the said corner members at a distance above said plant beds to clear the vegetables stacked thereon, and an inclined roller conveyor supported on said frame for holding an empty carton at substantial counter height above said platform and for conveying loaded cartons from said loading station onto said truck beds.

12. In a rig for packing and loading crops which have been cut and stacked on plant beds in which they were grown including a flat bed truck on wheels adapted to travel in furrows between said plant beds; a plurality of loading stations around the perimeter of said truck bed adapted to extend outwardly therefrom in a manner to overlie the plant beds adjacent the sides of said truck bed, means for hingedly securing said loading stations to the respective sides of said truck bed to facilitate swinging of said loading stations upwardly onto said truck bed during transport of said vehicle along a public road, each of said loading stations comprising a frame including an angle iron cap one angle iron side of which is adapted to lie adjacent to one side wall of said truck bed, a plurality of hinges secured to said one angle iron side of said cap and the top portion of said truck bed with the axes of said hinges in register along said sidewall of the truck bed, bracket angles secured to said one angle iron side of said cap adapted to engage said one side wall of said truck bed for supporting the angle iron cap of said frame parallel to the top surface of said truck bed, a pair of angle iron corner members suspended from the outer corners of the angle iron cap of said frame, a platform supported at the lower extremity of said bracket angles and the said corner members at a distance above said plant beds to clear the vegetables stacked thereon, and an inclined conveyor supported on said frame with its lower end disposed at substantial counter height above said platform and its upper end disposed at the level of said truck beds, said inclined conveyor comprising a plurality of transverse rolls for rollingly supporting a carton thereon and to facilitate manual discharge of loaded containers up onto said truck bed.

13. In a rig for packing and loading crops which have been cut and stacked on plant beds in which they were grown including a flat bed truck on wheels adapted to travel in furrows between said plant beds; a plurality of loading stations around the perimeter of said truck bed adapted to extend outwardly therefrom in a manner to overlie the plant beds adajacent the sides of said truck bed, means for hingedly securing said loading stations to the respective sides of said truck bed to facilitate swinging of said loading stations upwardly onto said truck bed during transport of said vehicle along a public road, each of said loading stations comprising a frame including an angle iron cap one angle iron side of which overlies the top and side of said truck bed, a plurality of hinges secured to said one angle iron side of said cap and the top portion of said truck bed with the axis of said hinges in register along said sidewall of the truck bed, bracket angles secured to said one angle iron side of said cap and adapted to extend downwardly therefrom for engaging said one side wall of said truck bed for supporting the angle iron cap of said frame parallel to the top surface of said truck bed, a pair of angle iron corner members suspended from the outer corners of the angle iron cap of said frame, a platform supported at the lower extremity of said bracket angles and the said corner members at a distance above said plant beds to clear the vegetables stacked thereon, an inclined conveyor supported on said frame with its lower end disposed at substantial counter height above said platform and its upper end at truck bed level for conveying loaded cartons from said loading station onto said truck beds.

14. In a rig for packing and loading crops which have been cut and stacked on plant beds in which they were grown including a flat bed truck on wheels adapted to travel in furrows between said plant beds; a plurality of loading stations around the perimeter of said truck bed adapted to extend outwardly therefrom in a manner to overlie the plant beds adjacent the sides of said truck bed, hinge means for hingedly securing said loading stations to the respective sides of said truck bed to facilitate swinging of said loading stations upwardly onto said truck bed during transport of said vehicle along a public road, each of said loading stations comprising a frame including an angle iron cap one angle iron side of which is adapted to lie adjacent and parallel to one side wall of said truck bed, said hinge means including a plurality of hinges secured to said one angle iron side of said cap and the top portion of said truck bed with the axis of said hinges in register along said sidewall of the truck bed, bracket angles secured to said one angle iron side of said cap adapted to engage said one side wall of said truck bed for supporting the angle iron cap of said frame parallel to the top surface of said truck bed, a pair of angle iron corner members suspended from the outer corners of the angle iron cap of said frame, a platform supported at the lower extremity of said bracket angles and the said corner members at a distance above said plant beds to clear the vegetables stacked thereon, and a conveyor supported on said frame comprising an inclined roller bottom having its lower end disposed at substantially counter height above said platform and its upper end disposed at the level of said angle iron cap along one side of said frame of said loading station.

15. In a rig for packing and loading crops which have been cut and stacked on plant beds in which they were grown including a flat bed truck on wheels adapted to travel in furrows between said plant beds; a plurality of loading stations around the perimeter of said truck bed adapted to extend outwardly therefrom in a manner to overlie the plant beds adjacent the sides of said truck bed, hinge means for hingedly securing said loading stations to the respective sides of said truck bed to facilitate swinging of said loading stations upwardly onto said truck bed during transport of said vehicle along a public road, each of said loading stations comprising a frame including an angle iron cap one angle iron side of which is adapted to lie adjacent one side wall of said truck bed, said hinge means including a plurality of hinges secured to said one angle iron side of said cap and the top portion of said truck bed with the axis of said hinges in register along said side wall of the truck bed, bracket angles secured to said angle iron side of said cap adapted to engage said one side wall of said truck bed for supporting the angle iron cap of said frame parallel to the top surface of said truck bed, a pair of angle iron corner members suspended from the outer corners of the angle iron cap of said frame, a platform supported at the lower extremity of said bracket angles and the said corner members at a distance above said plant beds to clear the vegetables stacked thereon, a conveyor supported on said frame including an inclined roller bottom having its lower end disposed at substantially counter height above said platform and its upper end disposed at the level of said angle iron cap along one side of said frame of said loading station, a table hingedly mounted on said angle iron cap adjacent one side of said inclined conveyor, an arcuate bracket pivotally connected to said table, and latch means on one of said corner uprights of said frame for latchingly receiving the opposite end of said bracket for supporting said table at truck bed level for the receipt of vegetables manually placed thereon from the field.

References Cited in the file of this patent

UNITED STATES PATENTS

| Number | Name | Date |
| --- | --- | --- |
| 2,073,127 | Upp | Mar. 9, 1937 |
| 2,337,615 | McLaren | Dec. 28, 1943 |
| 2,473,587 | Huston | June 21, 1949 |
| 2,578,189 | Johnston | Dec. 11, 1951 |
| 2,590,965 | Huston | Apr. 1, 1952 |
| 2,647,525 | Duda et al. | Aug. 4, 1953 |